(12) United States Patent
Sakata

(10) Patent No.: US 7,861,407 B2
(45) Date of Patent: Jan. 4, 2011

(54) BUSBAR STRUCTURE, METHOD OF PRODUCING THE BUSBAR STRUCTURE, AND ELECTRIC MOTOR HAVING THE BUSBAR STRUCTURE

(75) Inventor: Takatoshi Sakata, Yamatotakada (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 325 days.

(21) Appl. No.: 12/007,958

(22) Filed: Jan. 17, 2008

(65) Prior Publication Data

US 2008/0175732 A1 Jul. 24, 2008

(30) Foreign Application Priority Data

Jan. 19, 2007 (JP) ............................. 2007-010396

(51) Int. Cl.
*H01K 3/22* (2006.01)
(52) U.S. Cl. .................. 29/848; 29/830; 29/842; 29/876; 29/883
(58) Field of Classification Search .................. 29/848, 29/830, 842, 876, 883
See application file for complete search history.

(56) References Cited

U.S. PATENT DOCUMENTS 5,823,797 A * 10/1998 Sugiyama .................. 439/76.1

2007/0178723 A1 8/2007 Kataoka et al.

FOREIGN PATENT DOCUMENTS

| DE | 3834673 A1 | 8/1989 |
|---|---|---|
| JP | 2001-86695 | 3/2001 |
| JP | 2001-103700 | 4/2001 |
| JP | 2003-79079 | 3/2003 |
| JP | 2004-304874 | 10/2004 |
| JP | 2005-287240 | 10/2005 |
| JP | 2005-341640 | 12/2005 |
| WO | WO 00/57532 A3 | 9/2000 |

OTHER PUBLICATIONS

European Search Report dated May 9, 2008.

* cited by examiner

*Primary Examiner*—Derris H Banks
*Assistant Examiner*—Azm Parvez
(74) *Attorney, Agent, or Firm*—McGinn IP Law Group, PLLC

(57) ABSTRACT

A method of producing a busbar structure includes a busbar arranging step for arranging a plurality of the busbars at predetermined positions in a cavity which is formed between a fixed mold and a movable mold which can be clamped and opened with respect to the fixed mold, and clamping the two molds, a resin filling step for filling molten resin into the cavity in which the busbars have been arranged, and a busbar fixing step for hardening the molten resin which has been filled thereby to fix the busbars at predetermined positions with the hardened resin, and opening the two molds. Interposed pins to be interposed between the busbars which are arranged in close proximity to each other are detachably disposed in an engaged part of the movable mold, and removed from a molded product when the two molds are opened.

13 Claims, 4 Drawing Sheets

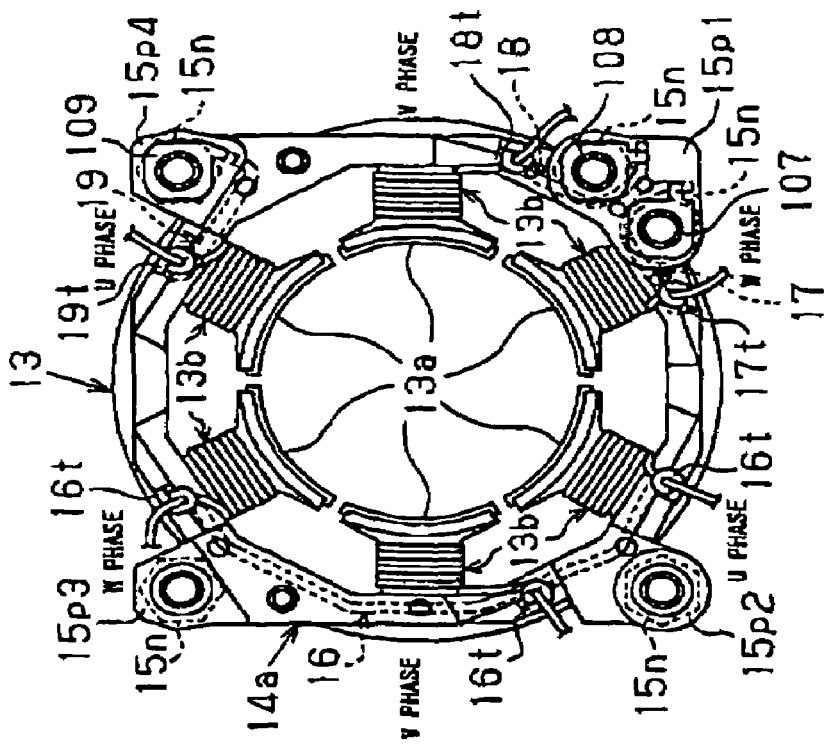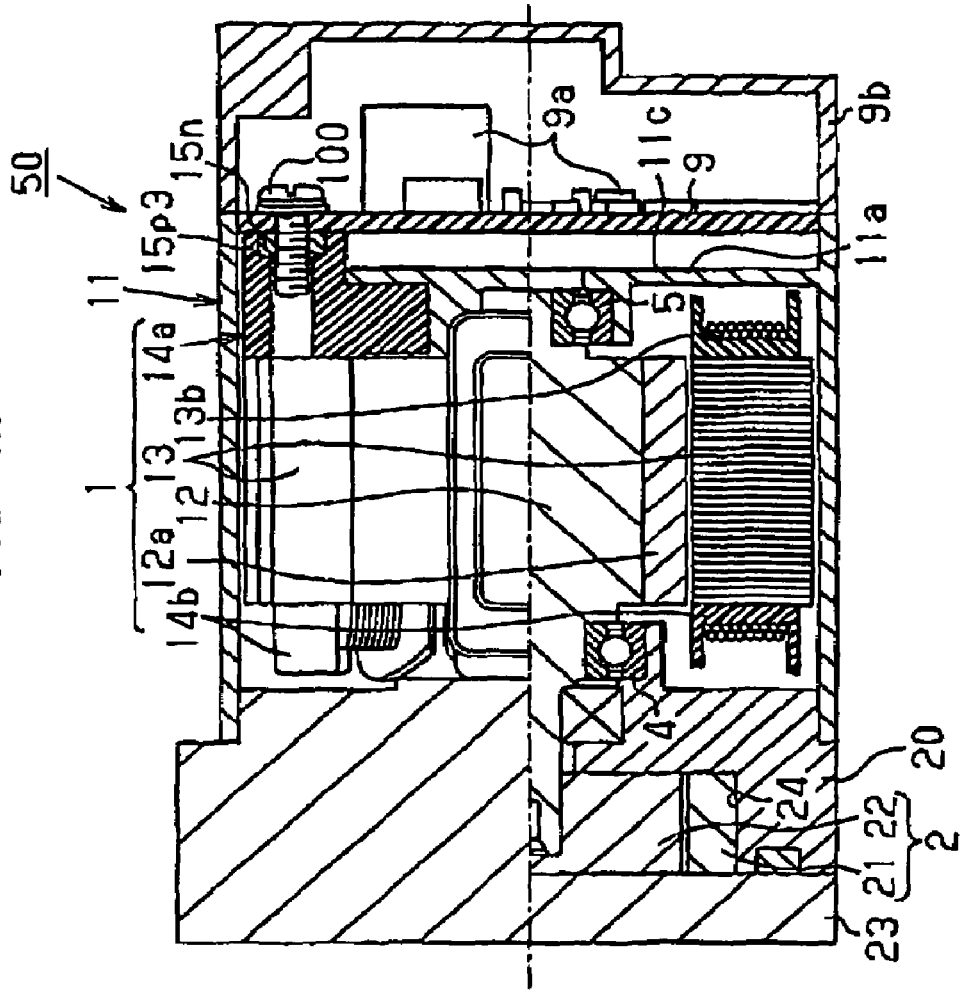

US 7,861,407 B2

BUSBAR STRUCTURE, METHOD OF PRODUCING THE BUSBAR STRUCTURE, AND ELECTRIC MOTOR HAVING THE BUSBAR STRUCTURE

BACKGROUND OF THE INVENTION

The present invention relates to a busbar structure which is attached to an electric motor and provided with busbars which function as relay members for relaying electrical connection between the electric motor and a control circuit and so on as an external circuit, a method of producing the busbar structure, and the electric motor having the busbar structure.

An electric motor provided with a stator core around which a coil is wound interposing an insulator has been heretofore known. Among the electric motors of this type, there is an electric motor provided with a busbar integrated type insulator which is formed by integrating an insulator for insulating the stator core from the coil and the busbars as the relay members for relaying electrical connection between the coil and an external control circuit and so on (Reference should be made to JP-A-2005-341640). In this case, the busbar is a sheet member formed of metallic material such as pure copper plated with tin which is cut into a determined shape and then, folded in a determined direction.

Generally, production of the busbar integrated type insulator as described above is conducted by in-mold molding, which is a kind of injection molding, in which a plurality of busbars are arranged at predetermined positions in a mold, and then, molten resin filled in the mold is hardened thereby to integrate the busbars into the resin which becomes an insulator part.

In such molding process, the busbars are arranged in the mold by positioning them with fixing pins or the like, before the molten resin is filled into the mold. However, in some cases, positional displacement of the busbars may occur due to arranging error on occasion of positioning or resin pressure of the molten resin, or deformation may occur in the busbar themselves due to the resin pressure, because the busbars are formed of soft material, and it is difficult to take dimensional tolerance. As described, it has sometimes happened that positioning accuracy of the busbars in the mold is deteriorated, and the resin is hardened in a state where the busbars which are arranged in close proximity to each other are electrically contacted with each other.

For this reason, in the obtained busbar integrated type insulator, deterioration of insulating performance and electrifying performance which may cause insulating destruction when electricity is energized and tested are observed. As the results, deterioration in yield of the electric motor is incurred, which has been a factor of increase of the production cost. Moreover, such phenomenon that electrical performance of the busbars integrated type insulator is deteriorated tends to be observed more and more, as the electric motor becomes compact as recently required for use in an automobile or the like.

SUMMARY OF THE INVENTION

The invention has been made in order to solve the above described problem, and its object is to provide a method of producing a busbar structure in which busbars which are arranged in close proximity to each other can be reliably prevented from being electrically contacted with each other at a time of molding, the busbar structure which can be produced by the production method, and an electric motor having the busbar structure.

In order to solve the above described problem, according to a first aspect of the invention, a method of producing a busbar structure comprises:

arranging a plurality of busbars in close proximity to each other in a mold;

interposing an interposed pin between the busbar; and integrally molding the busbars with resin.

According to this aspect, on occasion of producing the busbar structure by integrally molding a plurality of the busbars with the resin, the interposed pin to be interposed between the busbars which are arranged in close proximity to each other is disposed in the mold for molding. As the results, in the obtained busbar structure, such inconvenience that the busbars may be electrically contacted with each other due to arranging error on occasion of positioning the busbars or due to resin pressure of the molten resin will be reliably prevented.

According to a second aspect of the invention, the interposed pin is detachably disposed at a predetermined position in the mold.

According to this aspect, the interposed pin is detachably disposed at the predetermined position in the mold. Therefore, it is possible to dispose the interposed pin in the mold, when it is required for preventing electrical contact between the busbars which are arranged in close proximity to each other in the mold, or only at the required position.

According to a third aspect of the invention, in the arranging step, the busbars are arranged at predetermined position in a cavity which is formed between a fixed mold and a movable mold of the mold the movable mold being capable of being clamped and opened with respect to the fixed mold, and the fixed and movable molded are clamped, in the molding step, molten resin is filled into the cavity in which the busbars are arranged, and the molten resin is hardened to fix the busbars at predetermined positions with the hardened resin, and when the fixed and movable molds are opening after the molten resin is hardened, the interposed pin is moved from the molded product.

According to this aspect, when the molds are opened, the interposed pin is removed from the molded product along with the movement of the movable mold. As the results, the interposed pin will not remain in the obtained busbar structure, and removal of the interposed pin from the molded product too can be easily and reliably performed.

According to a fourth aspect of the invention, a busbar structure comprises:

a resin body;

a plurality of busbars molded in the resin body, the busbars being arranged in close proximity to each other; and a through hole that is formed through the resin body and arranged between the busbars, wherein the through hole is formed by removing an interposed pin which is interposed between the busbars for preventing the busbars from being electrically contacted with each other at the time of molding the busbars with resin.

According to this aspect, there is obtained the busbar structure in which the inconvenience that the busbars which are arranged in close proximity to each other are electrically contacted with each other due to arranging error on occasion of positioning or resin pressure of the molten resin is reliably prevented.

According to a fifth aspect of the invention, an electric motor comprises:

coils constituting phases;

a rotor surrounded by a stator core around which the coils are wound; and a busbar integrated type insulator for insulating the stator core from the coils and relaying electrical connection to an external control circuit, the insulator includes a busbar structure according to the fourth aspect.

According to this aspect, because the electric motor is provided with the busbar structure as claimed in claim 4, as the busbar integrated type insulator, electrical performance of the electric motor in its entirety will be enhanced.

According to the busbar structure, and the method of producing the busbar structure in this invention, the phenomenon that the busbars which are arranged in close proximity to each other are electrically contacted with each other at the time of molding can be reliably prevented, and the electrical performance of the obtained busbar structure will be enhanced.

BRIEF DESCRIPTION OF THE DRAWINGS

FIG. 1A is a sectional view taken in an axial direction showing an essential part of a motor-driven oil pump according to an embodiment of the invention, and FIG. 1B is an insulator part (including a stator core, coils, and busbars) according to the embodiment.

FIGS. 4A to 4C shows a process chart showing a production process of the busbar integrated type insulator according to the embodiment of the invention, in which FIG. 4A is a view showing a fixed mold and a movable mold in a clamped state, FIG. 4B is a view showing molten resin filled in a cavity of the molds, and FIG. 4C is a view showing a state where the fixed mold and the movable mold are opened after the molten resin has been hardened, and interposed pins fixed to the movable mold are removed.

DETAILED DESCRIPTION OF PREFERRED EMBODIMENTS

Figure 2:
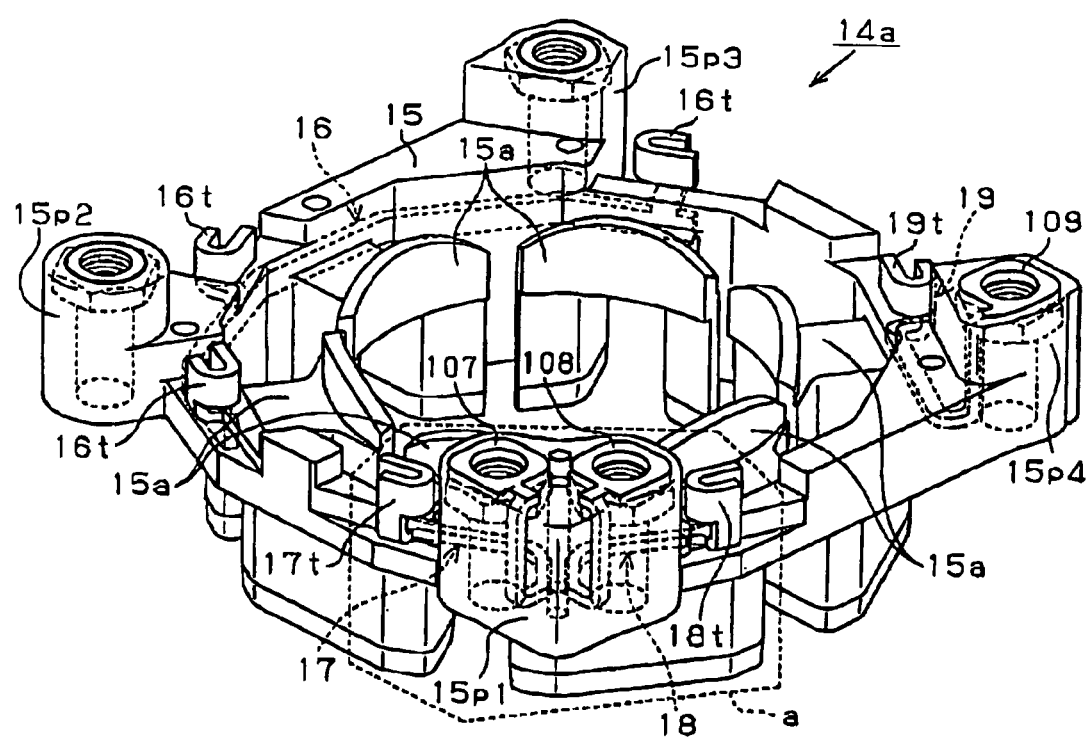
FIG. 2 is a perspective view showing a structure of a busbar integrated type insulator (a busbar structure) according to the embodiment of the invention.

Now, an embodiment of the invention will be described referring to the drawings.

As shown in FIG. 1A, a busbar integrated type insulator 14a in this embodiment is provided in an electric motor 1. This electric motor 1 is used in a motor-driven oil pump 50 for supplementing oil pressure which is lowered during idle stop, in a transmission of an automobile, as shown in FIG. 1A.

Referring to FIG. 1A, the motor-driven oil pump 50 integrally includes a pump part 2 which sucks and discharges oil (fluid), and the electric motor 1 which drives the pump part 2 to rotate. This pump part 2 is contained in a pump chamber 24 which is formed by a pump housing 20 in a shape of a bottomed tube and a pump plate 23 for closing an end part of the pump housing 20. The electric motor 1 is contained in a motor housing 11 which is integrally formed with the pump housing 20 so as to communicate therewith.

The aforesaid pump part 2 is a so-called trochoid pump, and includes an outer rotor 21 having internal teeth, and an inner rotor 22 having external teeth and meshed with the outer rotor 21.

As shown in FIGS. 1A and 1B, the aforesaid electric motor 1 includes a motor rotor 12 which is rotatably held in the pump housing 20 and the motor housing 11 respectively by means of a first and a second rolling bearings 4 and 5, a stator core 13 in a tubular shape which surrounds the motor rotor 12, and six (a plurality of) coils 13b which are wound around the stator core 13. This electric motor 1 is a brushless DC motor having three phases. Three pairs of the coils 13b which are opposed to one another constitute a U phase, a V phase, and a W phase. A magnet 12a in a tubular shape is rigidly fitted to an outer periphery of the motor rotor 12, as shown in FIG. 1A.

Referring to FIG. 1A, in the motor-driven oil pump 50 in this embodiment, a control board 9 for controlling the electric motor 1 is attached to the motor housing 11 at a side of a bottom part 11c of the motor housing 11. The control board 9 is contained and sealed in a controller containing part 9b, together with electronic components 9a such as coils and condensers on its control circuit.

In the motor-driven oil pump 50 in this embodiment, the inner rotor 22 is pivotally held by an end of the aforesaid motor rotor 12, whereby the inner rotor 22 is driven to rotate with the rotation of the motor rotor 12, thereby to suck and discharge the oil in cooperation with the outer rotor 21.

As shown in FIG. 1A, the busbar integrated type insulator 14a (the busbar structure) in this embodiment is fitted to the stator core 13 from a right side in an axial direction (from a side of the control board 9) in the aforesaid electric motor 1, and adapted to insulate the stator core 13 from the aforesaid coils 13b in cooperation with an insulator 14b which is fitted to the stator core 13 from a left side in the axial direction. The insulators 14a and 14b are formed of PPS (polyphenylene sulfide) resin (insulating substance).

The busbar integrated type insulator 14a is formed in a tubular shape as a whole, as shown in FIG. 1B and FIG. 2, and includes an annular part 15, and six (a plurality of) engaging parts 15a which are projected inward in a radial direction from the annular part 15 and adapted to be engaged with respective teeth 13a of the stator core 13 corresponding to the three phases, namely the U phase, V phase and W phase, as described above. In this busbar integrated type insulator 14a, four (a plurality of) busbars 16, 17, 18, 19 (having respective busbar terminals 16t to 19t which are connected to respective ends of the coils 13b) are integrally molded with the aforesaid resin by in-mold molding, which is a kind of injection molding, in a state arranged at predetermined positions, for the purpose of electrically connecting the coils 13b to one another, or electrically connecting the coils 13b which constitute the three phases to the aforesaid control board 9. In this embodiment, each of the busbars 16 to 19 is produced from a long-sized sheet member formed of metallic material (the sheet member of pure copper plated with tin) which is molded into a determined shape from a flat plate by folding or so.

Figure 3A:
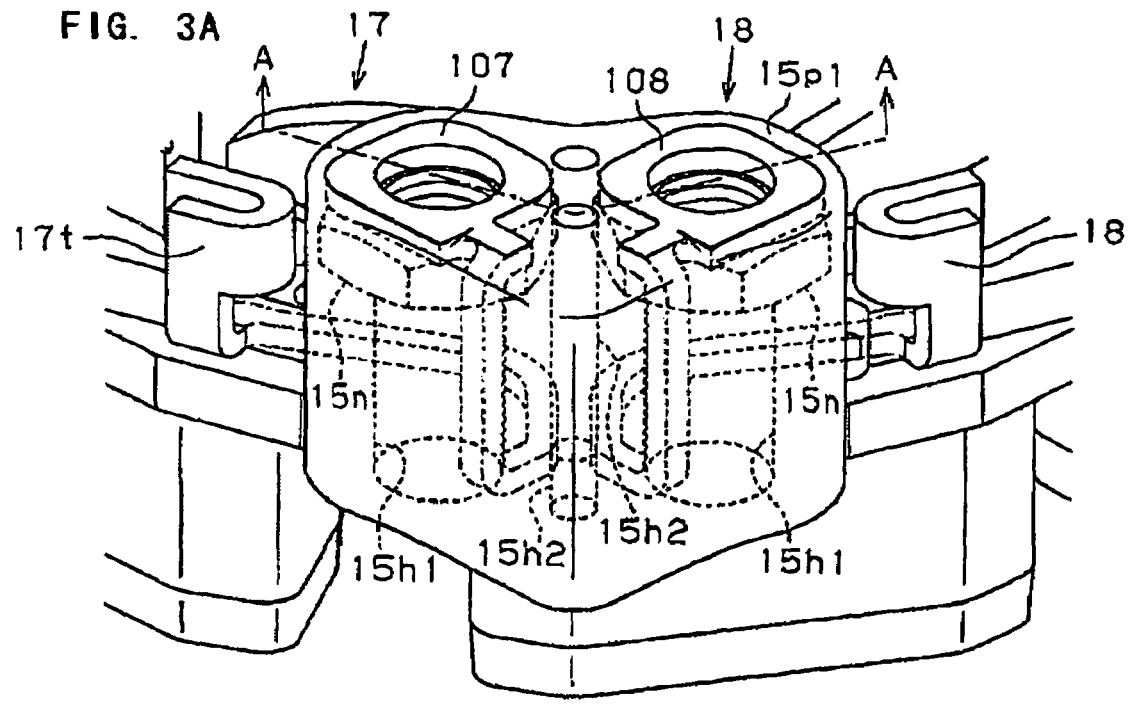
FIG. 3A is an enlarged perspective view showing a projected part which is projected toward a control board (a region encircled by a dotted line a in FIG. 2) in the busbar integrated type insulator according to the embodiment of the invention.
Figure 3B:
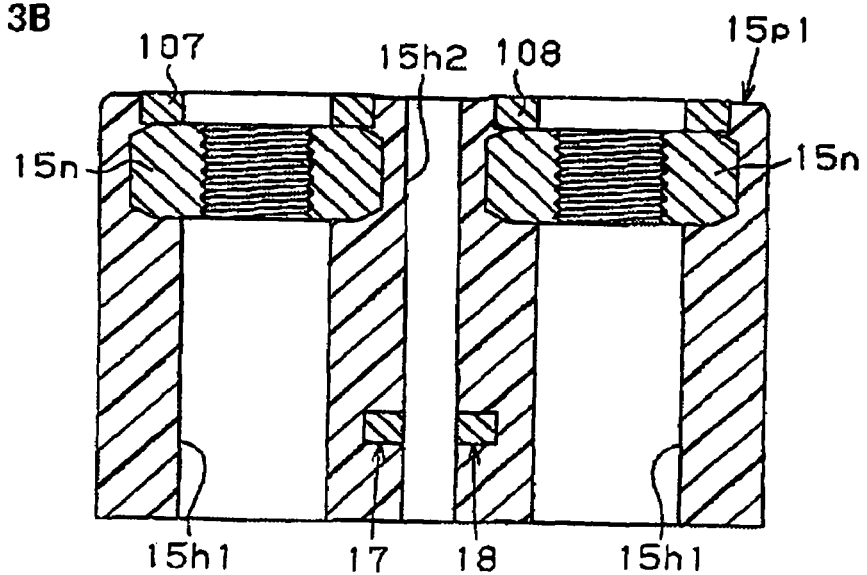
FIG. 3B is a sectional view taken along a line A-A in FIG. 3A.

Moreover, referring to FIGS. 1A, 1B and FIG. 2, four (a plurality of) projected parts 15p1 to 15p4 are provided on the annular part 15 of the aforesaid busbar integrated type insulator 14a so as to project toward the aforesaid control board 9. In each of the projected parts 15p2 to 15p4, one nut 15n is embedded by in-mold molding, while in the projected part 15p1 which is shown in an enlarged scale in FIGS. 3A and 3B, the two nuts 15n, 15n are embedded together with a part of the busbars 17, 18 by in-mold molding. Then, bolts 100 are respectively screwed into the nuts 15n passing through the control board 9 (See FIG. 1). In this manner, the control board 9 is fixed to the busbar integrated type insulator 14a at the aforesaid projected parts 15p1 to 15p4, and the aforesaid busbars 17 to 19 are electrically connected to the control circuit which is provided on the control board 9 (The busbar 16 functions as a common electrode, and not directly connected to the control circuit on the control board 9). In this manner, driving electric current which is controlled by the aforesaid control circuit is supplied to a pair of the coils 13*b* which constitute the phases, U, V and W. More specifically, the busbars 17 to 19 as shown in FIG. 1B and FIG. 2 are integrally provided with ring-like portions 107, 108, and 109. The control board 9, the ring-like portions 107, 108, 109, and the nuts 15*n* are fixed by screwing the bolts 100 in a state where they are in face contact with one another, and consequently, the aforesaid coils 13*b* are electrically connected to the control circuit on the control board 9 by way of the respective busbars 17 to 19. In the projected part 15*p*1 as shown in FIGS. 3A and 3B, a pair of the bolts 100 are screwed into the nuts 15*n*, in a state respectively passed through the through holes 15*n* which are formed through the projected part 15*p*1.

The busbar integrated type insulator 14*a* in this embodiment is characterized in that on occasion of integrally molding a plurality of the busbars 17 to 19 with PPS resin (the resin) by in-mold molding, a pair of interposed pins p1, p2 formed of rod-like members (See FIGS. 4A to 4C) are disposed in the mold so as to be interposed between the adjacent busbars 17, 18 in the projected part 15*p*1 of the busbar integrated type insulator 14*a*. Characteristic feature of the production method will be described below, referring to a process for forming the above described projected part 15*p*1.

Figure 4A:
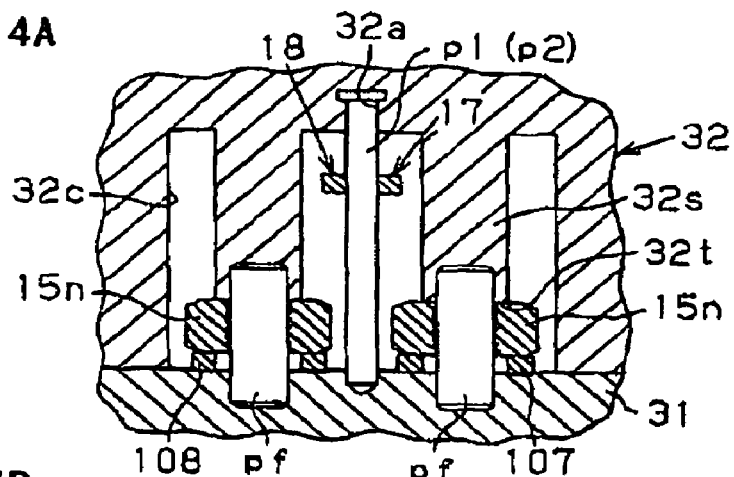

Specifically, as shown in FIG. 4A, as a first step, the busbars 17, 18 are arranged in close proximity to each other at predetermined positions (See FIG. 2) in a cavity 32*c* which is formed between a fixed mold 31 and a movable mold 32 which can be closed and opened with respect to the fixed mold 31, together with the other busbars 16, 19 (omitted in FIG. 4A). Thereafter, the two molds 31, 32 are clamped (busbar arranging step).

More specifically, the ring-like portions 107, 108 of the aforesaid busbars 17, 18 and the nuts 15*n* in a state where they are in face contact with one another are fixed in the fixed mold 31 after inserting them over fixed pins pf, pf which are engaged and fixed at predetermined positions in the fixed mold 31. Thereafter, on occasion of clamping the two molds 31, 32, the two interposed pins p1, p2 which have been detachably fitted to (disposed in) an engaged part 32*a* (a predetermined position) of the movable mold 32 in advance are moved together with the movable mold 32, and inserted into a region (a space) between the busbars 17, 18 to be filled with the resin. Moreover, protruded parts 32*s*, 32*s* which are provided on the movable mold 32 so as to protrude toward the fixed mold 31 are engaged with the aforesaid fixed pins pf, pf, and distal end faces 32*t* of the protruded parts 32*s* are butted against end faces of the nuts 15*n* at their inner diameter side, so that the molten resin may not intrude into the nuts 15*n*.

Figure 4B:
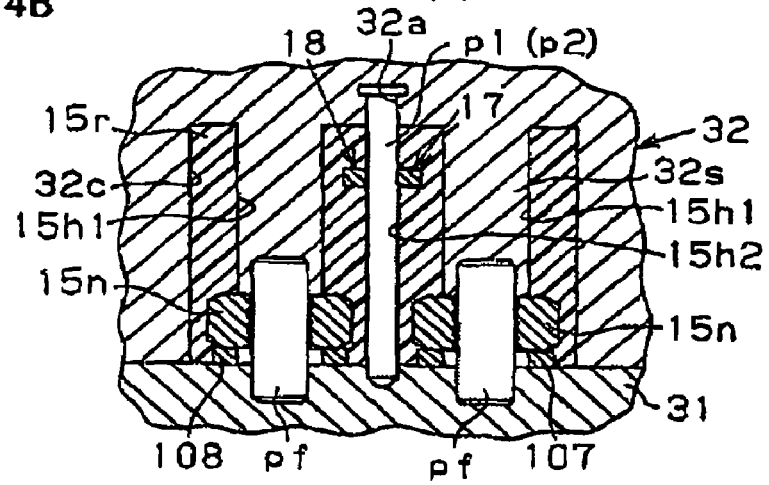

Then, as shown in FIG. 4B, molten resin 15*r* is filled into the cavity 32*c* in which the busbars 16 to 19 have been arranged, from a plurality of gates which are not shown (resin filling step).

In this embodiment, the interposed pins p1, p2 are interposed between the busbars 17, 18 which are arranged in close proximity to each other in the above described busbar arranging step, and therefore, such inconvenience that positional displacements of the busbars 17, 18 may occur due to arranging error on occasion of positioning the busbars 17, 18 in the fixed mold 31 or resin pressure of the molten resin 15*r* which has been filled in the cavity 32*c*, resulting in electrical contact between them will be effectively prevented.

Figure 4C:
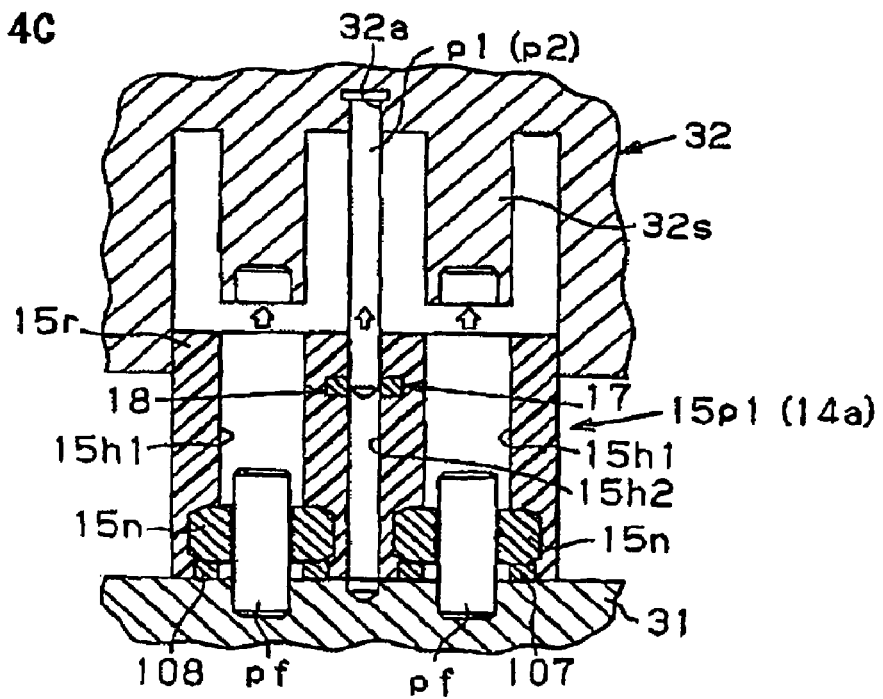

Thereafter, as shown in FIG. 4C, the molten resin 15*r* which has been filled is hardened, and the busbars 16 to 19 are fixed to the predetermined positions of a molded product with the hardened resin (See FIG. 2). Thereafter, the aforesaid two molds 31, 32 are opened (busbar fixing step).

In this embodiment, the interposed pins p1, p2 are moved along with movement of the movable mold 32 when the two molds 31, 32 are opened, and the molded product (the hardened resin) is removed. Then, a pair of through holes 15*h*2, 15*h*2 formed by the removal of the interposed pins p1, p2 remain in the projected part 15*p*1 of the obtained busbar integrated type insulator 14*a* (See FIG. 3B).

Finally, the busbar integrated type insulator 14*a* is removed from the fixed mold 31 to obtain a finished product.

As described above, according to the method of producing the busbar integrated type insulator 14*a* (the busbar structure) in this embodiment, the following functions and advantages can be obtained.

(1) In this embodiment, on occasion of producing the busbar integrated type insulator 14*a* by integrally molding a plurality of the busbars 16 to 19 with the resin, the interposed pins p1, p2 to be interposed between the busbars 17, 18 which are arranged in close proximity to each other are disposed in the movable mold 32 for molding. As the results, such inconvenience that the busbars 17, 18 may be electrically contacted with each other due to arranging error on occasion of positioning the busbars 17, 18 or due to the resin pressure of the molten resin will be reliably prevented.

(2) In this embodiment, the interposed pins p1, p2 are detachably disposed in the engaged part 32*a* of the movable mold 32. Therefore, it is possible to dispose the interposed pins p1, p2 in the movable mold 32, when they are required for preventing electrical contact between the busbars 17 and 18, or only at the required positions.

(3) In this embodiment, when the molds 31, 32 are opened, the interposed pins p1, p2 are removed from the molded product (the hardened resin) along with the movement of the movable mold 32. As the results, the interposed pins p1, p2 will not remain in the obtained busbar integrated type insulator 14*a*, and removal of the interposed pins p1, p2 from the molded product too can be easily and reliably performed.

(4) In this embodiment, the electric motor 1 is provided with the busbar integrated type insulator 14*a* in which such inconvenience that the busbars 17, 18 may be electrically contacted with each other due to arranging error on occasion of positioning the busbars 17, 18 or resin pressure of the molten resin is reliably prevented. As the results, electrical performance of the electric motor in its entirety will be enhanced.

Further, the above described embodiment may be modified as follows.

In the above described embodiment, the interposed pins p1, p2 to be interposed between the busbars 17, 18 which are arranged in close proximity to each other are disposed in the movable mold 32 for molding. However, the interposed pins p1, p2 may be disposed in the fixed mold 31 alternatively, or may be disposed in both the molds 31, 32 for molding.

In the above described embodiment, the interposed pins p1, p2 are formed of a pair of rod-like members. However, the interposed pins p1, p2 may be formed of a pair of plate-like members. Alternatively, the pins do not have to be in a pair, but a single pin may be used.

In the above described embodiment, the interposed pins p1, p2 are disposed at one position in the movable mold 32 (the mold). However, the interposed pins p1, p2 to be interposed between the busbars which are arranged in close proximity to each other may be disposed at desired positions in the mold. For example, the interposed pins may be distributed to a plurality of positions in the mold.

In the above described embodiment, the electric motor 1 provided with the busbar integrated type insulator 14*a* is used in the motor-driven oil pump 50 for supplementing oil pressure which is lowered during idle stop, in a transmission of an automobile. However, it is of course possible to use this electric motor for other uses in an automobile, for example, as the electric motor for assisting steering motion of an electric power steering device, or for general-purpose other than the use in an automobile.

Further, technical concept which can be grasped from the above described embodiment and modifications will be described below.

In the transmission of an automobile, a motor-driven oil pump for supplementing oil pressure which is lowered during idle stop, wherein a pump part for sucking and discharging oil is integrally formed with an electric motor for rotating the pump part, characterized in that the electric motor as claimed in claim 5 is used as the aforesaid electric motor. According to this structure, electric performance of the electric motor in the motor-driven oil pump for supplementing the oil pressure which is lowered during idle stop is enhanced. As the results, reliability as the motor-driven oil pump for use in an automobile is enhanced.

What is claimed is:

1. A method of producing a busbar structure, the method comprising:
   arranging a plurality of busbars in close proximity to each other in a mold;
   interposing an interposed pin between the plurality of busbars at a position such that an axis, extending through an axial length of the interposed pin, does not pass through the plurality of busbars; and
   integrally molding the busbars with resin.

2. The method according to claim 1, wherein the interposed pin is detachably disposed at a predetermined position in the mold.

3. The method according to claim 1, wherein:
   in the arranging, the busbars are arranged at predetermined position in a cavity which is formed between a fixed mold and a movable mold of the mold the movable mold being capable of being clamped and opened with respect to the fixed mold, and the fixed and movable molded are clamped,
   in the molding, molten resin is filled into the cavity in which the busbars are arranged, and the molten resin is hardened to fix the busbars at predetermined positions with the hardened resin, and
   when the fixed and movable molds are opening after the molten resin is hardened, the interposed pin is moved from the molded product.

4. A busbar structure, produced by the method according to claim 1.

5. The method according to claim 1, wherein the plurality of busbars are disposed on a common plane.

6. The method according to claim 1, wherein a distal end portion of a busbar of the plurality of busbars is opposite a distal end of another busbar of the plurality of busbars.

7. The method according to claim 1, wherein distal ends of the plurality of busbars comprise a loop.

8. The method according to claim 1, wherein the plurality of busbars are disposed circumferentially such that a cavity is formed in a center of the plurality of busbars.

9. The method according to claim 1, wherein the interposed pin is disposed between distal ends of a pair of busbars of the plurality of busbars.

10. The method according to claim 7, wherein another interposed pin is disposed inside the loop.

11. The method according to claim 1, wherein the axis of the interposed pin does not pass through the plurality of busbars.

12. The method according to claim 1, wherein longest portions of the plurality of busbars are disposed on a common plane.

13. The method according to claim 1, wherein distal ends of longest portions of a pair of the plurality of busbars are opposed to one another.

\* \* \* \* \*